United States Patent [19]

Niemeyer, III

[11] Patent Number: 4,916,467
[45] Date of Patent: Apr. 10, 1990

[54] DIRECT WRITING OVER-THE-DRUM GRAPHIC RECORDER

[75] Inventor: Robert H. Niemeyer, III, Beaverton, Oreg.

[73] Assignee: AM International Corporation, Chicago, Ill.

[21] Appl. No.: 207,192

[22] Filed: Jun. 16, 1988

Related U.S. Application Data

[63] Continuation-in-part of Ser. No. 75,531, Jul. 20, 1987, Pat. No. 4,794,408.

[51] Int. Cl.$^4$ .............................................. G01D 15/16
[52] U.S. Cl. .................................... 346/139 R; 346/49
[58] Field of Search ..................... 346/139 R, 141, 49, 346/29, 46

[56] References Cited

U.S. PATENT DOCUMENTS 4,527,176 7/1985 Fujiwara ............................. 346/141
4,683,480 7/1987 Sakamoto ....................... 346/139 R Primary Examiner—Bruce A. Reynolds
Assistant Examiner—Mark Reinhart
Attorney, Agent, or Firm—Roy A. Ekstrand; Nicholas A. Camasto

[57] ABSTRACT

A graphic recorder includes a moveable pen carriage and drive means associated with the pen carriage for causing it to travel back and forth under computer control. A media roller defines a continuous cylindrical member supported beneath the carriage path and coupled to a computer controlled media drive system. Recording pens supported on the pen carriage are selectively lowered into recording positions in which they write upon a flexible media and against the media roller directly.

2 Claims, 3 Drawing Sheets

DIRECT WRITING OVER-THE-DRUM GRAPHIC RECORDER

CROSS REFERENCE TO RELATED APPLICATIONS

This application is a continuation in part of copending application entitled FOLLOWING ERROR LIMIT SYSTEM FOR GRAPHIC RECORDER file July 20, 1987 in the name of Robert H. Niemeyer III, serial number 07/075,531 which is assigned to the assignee of the present invention.

In addition, this application discloses apparatus described and claimed in a related application entitled ROTARY ACTION GRAPHIC RECORDING SYSTEM, filed July 20, 1987 in the name of Robert H. Niemeyer III, serial number 07/075,533 which is assigned to the assignee of the present application.

FIELD OF THE INVENTION

This invention relates generally to recording systems and particularly to those in which one or more recording elements are carried by a carriage moveable along a carriage path and in which a recording media is moved relative to the path of carriage motion to provide the desired recording upon the media.

BACKGROUND OF THE INVENTION

Through the years a number of recording devices have been created which provide a graphic output under computer control. Such devices include both graphic recorders and photoplotters in which a moveable recording element carriage is moved back and forth along a first path while a recording media is moved back and forth along a second path. In most instances, the motion paths for the media and the recording element carriage are perpendicular to each other.

In graphic recorders, one or more recording elements such as pens, are carried by the carriage and supported above the media. Means are provided for lowering one of the pens into contact with the media during times in which recording upon the media is desired.

The recording operation takes place in response to computer control which operates the recording element carriage and media movement in a coordinated fashion to produce the desired recorded image upon media. In most system, the recording element carriage is supported by one or more roller and track mechanisms which permit the free movement of the carriage along the carriage path. Usually, the recording element carriage is coupled to a continuous band drive system in which a pair of opposed rollers are supported at each end of the carriage path and a flexible band encircles the rollers and is supported in tension. At least one of the rollers is coupled to a drive motor which provides movement of the carriage band which in turn moves the carriage along the carriage path.

The media is positioned upon a carriage bed beneath the pen carriage path and is secured and driven by a plurality of rollers which are coupled to computer controlled drive means within the recorder. While several different configurations for the media drive means have been utilized, the most common system provides a pair of media roller shafts positioned above and below the media and spaced from the pen contact line for the pen carriage. The shafts each carry two or more rollers generally formed of a resilient material such as rubber or plastic which captivate the media and roll it back and forth across the carriage bed during the recording operation. A platen or recording surface is positioned beneath the pen carriage path and supports the media against the recording pen. In many instances, the platen defines an elongated groove or recess extending across the platen beneath the point of pen contact with the media. The recess provides some cushion for the recording pens and accommodates variations in recording pen extension. Thus, the media drive rollers are offset from the portion of the media in contact with the recording pens. This offset configuration is utilized to permit the recording pen carriage to move freely above the media along the recording line or path. However, the use of this offset configuration often produces problems in the recording process itself. For example, rapid media movement in the direction from the roller location toward the recording pen contact line often causes buckling of the media. In addition, the offset between the media drive rollers and the recording line necessitates a greater border upon the media at each end in the direction of media motion. Further, the offset imposes certain limitations upon the system as to recording pen pressure and pen writing characteristics as well as recording speeds.

While such offset media drive systems have met with some success in the marketplace, the limitations upon recorder performance which they impose have, in the wake of recent advances in the development of the remainder of the graphic recording system, become a source of significant limitation of overall graphic recorder performance. There arises, therefore, a need in the art for an improved, more effective system of media motion for graphic recorders which avoids imposing the above-described limitations.

SUMMARY OF THE INVENTION

Accordingly, it is a general object of the present invention to provide an improved graphic recording system. It is a more particular object of the present invention to provide an improved media drive system for use in a moveable carriage type recording system which facilitates rapid media movement during recording.

In accordance with the invention there is provided for use in a graphic recorder for recording upon a media, the graphic recorder having drive means for moving a pen carriage back and forth along a carriage path to establish a pen recording line and control means operative upon the drive means to control pen carriage motion, media drive means comprising a continuous writing drum having a cylindrical writing surface and opposed outer edges supported beneath the recording line and supporting the media upon the writing surface, a pair of pinch rollers supported above the media overlying the outer edges of the writing drum captivating the media against the writing drum such that the recording pen contacts the media above the cylindrical writing surface and forces it against the writing drum.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
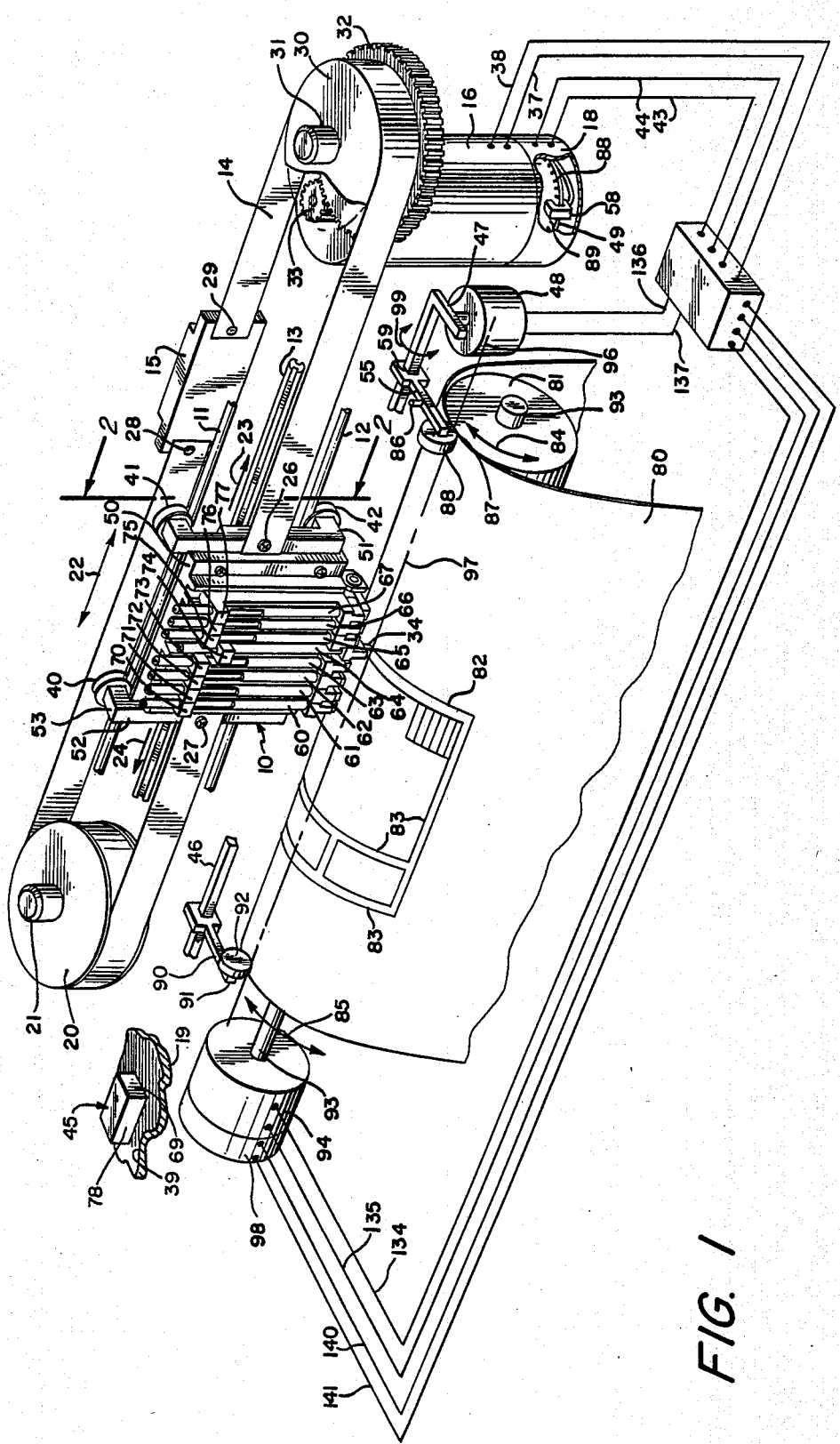
FIG. 1 is a partially sectioned perspective view of a direct writing over-the-drum graphic recorder constructed in accordance with the present invention.

FIG. 1 sets forth a perspective view of a direct writing over-the-drum graphic recorder constructed in accordance with the present invention. A moveable pen carriage, generally referenced by numeral 10, is secured to and controlled by a closed flexible carriage band 14. Carriage band 14 may be fabricated from any number of flexible strong materials. However, in its preferred form it comprises a generally flat ribbon-like band of stainless steel. An upper track 11 and lower track 12 are supported parallel to the motion path of the forward portion of carriage band 14 by means not shown. Any of the presently available track support structures used in graphic recorders may be used to support carriage 10 provided a substantially rigid construction which supports the weight of pen carriage 10 is provided.

Pen carriage 10 includes a pen shuttle guide 50 formed of a lightweight, rigid plastic material. A pair of generally U-shaped wheel support members, also formed of a lightweight, rigid plastic material 51 and 52, are secured to pen shuttle guide 50. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end. A quartet of grooved wheels 40, 41, 42, and 43 are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24. Pen carriage 10 further includes a downwardly extending stop block 68 adjacent wheel support 52, the function of which is set forth in greater detail below.

In accordance with the multiple pen capability described above, pen carriage 10 supports a plurality of generally elongated pen shuttles 70 through 77 which are moveably secured to pen shuttle guide 50 in a linear array. Pen shuttles 70 through 77 are generally perpendicular to the direction of travel of pen carriage 10. Pens shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position while pen 64 is supported in its downwardly extending position. With pen 64 in its downward position as shown, pen tip 34 contacts media 80 such that motion of pen carriage 10 in the direction shown by arrow 22 results in pen recording along a recording line 97.

A media driver roller 81, constructed in accordance with the present invention, includes a support shelf 93. Shaft 93 and media drive roller 81 define a common major axis 96. Shaft 99 is supported by conventional means (not shown) such that major axis 96 is generally parallel to the travel path of pen carriage 10. A media drive motor 94 having an encoder 98 is directly coupled to shaft 93 to impart rotational power to shaft 93 and media drive roller 81. A flexible media 80 comprising a long sheet representative of a typical media material is supported by media roller 81 such that rotational motion of media roller 81 in the manner indicated by arrows 84 results in a corresponding linear motion of media 80 indicated by arrow 85. Motor 94 and encoder 98 are coupled to computer control unit 17 of the recorder by means of connections 134 and 135 and connections 140 and 141 respectively.

An elongated beam 46 is pivotally supported by means (not shown) in accordance with conventional graphic recorder fabrication techniques in a position slightly above and substantially parallel to major axis 96 of media roller 81. A pivotal arm 47 is coupled to beam 46 and extends toward media roller 81. A motor 48 is coupled to arm 47 such that operation of motor 48 causes rotation of beam 46 as indicated by arrow 89. Motor 48 is coupled to computer control unit 17 by connection 136 and 137. A roller arm 55 has a generally elongated structure defining an aperture 59 at one end and receives beam 46. Roller arm 55 further defines an inwardly facing axle 87 at the other end and supports an upwardly extending pin 86. Roller 88 is rotationally coupled to axle 87 and in its preferred form comprises a soft elastic material such as plastic or rubber. A second roller arm 90 generally similar to roller arm 55 is supported upon beam 46 on the opposite end of media roller 81 from roller arm 55 and defines an inwardly facing axle 91 which in turn supports a second roller 92 similar in size and fabrication to roller 88.

In accordance with an important aspect of the present invention, it should be noted that media roller 81 supports media 80 directly under pen carriage 10 such that the recording pens supported in a linear array on pen carriage 10 are lowered to writing positions in which the recording pen elements such as pen tip 34 contact media 80 and exert a recording pressure directly against media roller 81. This operation provides direct writing against media roller 81 without the use of an interposed platen or writing surface of the type used in the prior art described above. In addition, it should e further noted that the motion of pen carriage 10 within its pen carriage path causes the recording pens supported by the pen carriage to record along recording line 97 shown in dashed line representation in FIG. 1. In accordance with a further aspect of the present invention, recording line 97 is parallel and vertically aligned with major axis 96 of media roller 81. Thus, the recording pens supported upon pen carriage 10 are caused to write along recording line 97 in a manner whereby the recording force is exerted upon the media and against the surface of media roller 81. Rollers 88 and 92 are aligned with respect to media roller 81 such that the contact with media 80 of rollers 88 and 92 is placed at either end of media 80 and is coincident with recording line 97. As is set forth above, motor 48 imparts sufficient rotational torque to beam 46 to force rollers 88 and 92 against media 80 and media roller 81 with sufficient force to securely captivate media 80 against media roller 81.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counterweight 15. Except for the gap at counterweight 15, carriage band 14 comprises a continuous ribbon of material extending from fastener 28 around pulley 20 through pen carriage 10 and around drive pulley 30 to fastener 29. As a result, carriage band 14 extends through pen carriage 10. Pulley 20 comprises a free moving idler pulley while drive pulley 30 supports a ring gear 32. A carriage motor 16 which may comprise any of the number of presently available bidirectional electric motors, supports a drive gear 33 at one end which, in accordance with generally accepted principles of graphic recorder construction, is operatively coupled to the armature of carriage motor 16 (not shown) such that energizing carriage motor 16 results in rotating gear 33. A pair of electrical connections 35 and 36 are coupled to a pair of wires 38 and 37 respectively. Drive pulley 30 is supported with respect to gear 33 such that gear 33 engages gear 32 causing drive pulley 30 to rotate in response to energizing of carriage motor 16. An encoder 18 is coupled to motor 16 at the opposite end from drive gear 33. While any number of presently available encoder systems may be used for encoder 18, it has been found to be advantageous to use an optical encoder. Such optical encoders are well-known and typically include an encoder disk coupled to the motor shaft having a plurality of optically opposed areas interleaved abut its periphery which are sensed by an optical pickup having a light source and detector. As the encoder disk rotates, the areas disrupt the light coupling between the light source and the sensor to produce a series of motion indicative signals. Accordingly, encoder 18 includes an encoder disk 49 having interleaved opaque and transparent areas 88 and 89 respectively which is coupled to the rotor shaft of motor 16 (not shown). A sensor assembly 58 includes a pair of optical pickups (described below) which are coupled to computer controller 17.

By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. Actuator beam 13 is operatively coupleable to selected ones of pen shuttles 70 through 77 to produce vertical motion of a selected one of pens 60 through 67.

A computer control unit 17 constructed in accordance with the present invention and described below in greater detail, is operatively coupled to motor 16 by connections to wires 38 and 37 and to encoder 18 by a pair of wires 43 and 44. A limit stop 45 defines a generally rectangular stop portion 78 which further defines a generally vertical surface 69. A frame 19, the details of which are not shown but which should be understood to be constructed in accordance with conventional graphic recorder techniques, defines a generally flat surface 39. Limit stop 45 is positioned upon surface 39 such that surface 69 is within the travel path of carriage 10. As a result, movement of carriage 10 toward limit stop 45 produces contact between surface 69 of limit stop 45 and wheel support 52 which obstructs further carriage motion. In accordance with an important aspect of the present invention, the position of limit stop 45 along the travel path of carriage 10 is selected such that the point at which surface 69 contacts wheel support 52 coincides with the desired left side reference point or limit of carriage 10 travel.

In operation, motor 48 is operated so as to pivot arm 47 upwardly and produce a corresponding clockwise rotation of beam 46 which in turn rotates roller arms 55 and 90 and raises rollers 88 and 92 away from and out of contact with media 80. With rollers 88 and 92 raised, media 80 is freely moveable upon media roller 81 and is positioned thereupon at the desired alignment and right to left position for the graphic recording process. It should be noted that roller arm 55 is moveable laterally upon beam 46 to adjust the position of roller 88 to accommodate different widths of media 80. In accordance with the preferred positioning of media 80 in the present invention system, the left edge of media 80 is positioned beneath roller 92 and the position of roller arm 55 is adjusted to accommodate the width of media 80. Accordingly, the position of roller arm 90 is fixed with respect to beam 46 at the desired left edge position of media 80. Once media 80 is properly positioned and roller arm 55 is positioned upon beam 46 to accommodate the width of media 80, motor 48 is activated to rotate arm 47 downwardly causing a counterclockwise rotation of beam 47 which in turn pivots roller arms 55 and 90 and brings rollers 92 and 88 into contact with the edges of media 80. Pin 86 is supported by roller arm 55 which assures that the position of pin 86 along the travel path of pen carriage 10 is also adjusted by positional adjustments of roller arm 55 to accommodate the width of media 80. Aperture 59 is precisely fitted to beam 46 such that roller arm 55 is freely moveable upon beam 46 when roller 88 is out of contact or raised with respect to media 80. When motor 48 pulls arm 47 downwardly, however, the force coupled to beam 46 by rollers 88 and 92 against media 80, causes arm 55 to be securely positioned upon beam 46. As a result, once rollers 88 and 92 are brought into engagement with media 80, roller arm 55 is for all practical purposes immovable with respect to beam 46 and media 80.

Once media 80 is properly positioned and rollers 88 and 92 engage media 80, computer control 17 commences the initialization process described in the above-referenced copending application for a Following Error Limit System for Graphic Recorder to establish the reference or limit points which will be used by computer control 17 in determining the position of pen carriage 10. While the initialization process used by computer control 17 to establish the operational limit points of pen carriage 10 with respect to media 80 is described in greater detail in the above-referenced copending application for a Following Error Limit System for Graphic Recorder, suffice it to note here that computer control 17 initially activates motor 16 to drive pen carriage 10 in the direction indicated by arrow 24 until pen carriage 10 impacts surface 69 of limit stop 78. Once impact has occurred, computer control 17 detects the obstruction provided by limit stops 78 and establishes a left margin reference point for media 80. Similarly, computer control 17 energizes motor 16 in the opposite direction causing pen carriage 10 to be moved in the direction indicated by arrow 23 until pen carriage 10 impacts pin 86 on arm 55 causing a second obstruction of pen carriage motion to occur. Once again, computer control 17 detects the occurrence of pen carriage motion obstruction and establishes a right margin reference point for media 80.

Once the initialization process is complete and the reference or absolute points are established, further motions of pen carriage 10 are interpreted by computer control 17 solely in response to the output of encoder 18. Computer control 17 is thereafter operative to cause motor 16 to drive carriage band 14 and thereby pen carriage 10 back and forth along the travel path indicated by arrows 23 and 24 to produce motion of pen carriage 10 in either of two directions along the carriage travel path. During back and forth motions of pen carriage 10 the selected recording pen is lowered to record upon recording line 97.

During the plotting motions of pen carriage 10, a corresponding motion is imparted to encoder disk 49. Encoder disk 49 comprises a plurality of opaque areas 89 interleaved with a corresponding plurality of transparent areas 88. A sensor 58 constructed in accordance with conventional optical encoder techniques responds to the rotation of encoder disk 49 and produces a plurality of pulse signals indicative of the extent of encoder disk motion and the direction of that motion. The pulse signals produced by sensor 58 are processed by encoder 18 and coupled to computer control 17 by wires 43 and 44. By means described below in greater detail, computer control 17 utilizes the pulse signals produced by encoder 18 to determine the position of pen carriage 10.

Concurrently, computer control 17 is operatively coupled to media roller 81 through motor 94 and encoder 98 to rotate media roller 81 in either of the directions indicated by arrow 84 and cause a corresponding motion of media 80 in either of the directions indicated by arrow 85. Media roller 781 includes a center support shaft 93 which as mentioned above is supported in accordance with conventional bearing and support structures which are omitted from FIG. 1 for clarity but which should be understood to be constructed in accordance with conventional fabrication techniques. Shaft 93 extends outwardly from the left side of media roller 81 and is directly coupled to motor 94. Thus, motor 94 is operatively coupled to shaft 93 by a direct coupling such that rotation of motor 94 causes a corresponding rotation of support shaft 93 and thereby media roller 81.

Motor 94 is constructed in accordance with the above-described construction of motor 16 and includes an encoder 98 constructed in accordance with encoder 18 of motor 16. By further similarity, motor 94 is coupled to computer control 17 by a pair of connecting 134 and 135 while encoder 98 is coupled to computer control 17 by a pair of connections 140 and 141. As a result, computer control 17 is operative during the plotting process to provide the desired clockwise and counterclockwise rotations of shaft 93 and thereby media roller 81 to provide the desired relative motion between media 80 and the recording pens. By means such as that which is set forth in generator detail in the above-referenced copending application for a Rotary Action Graphic Recording System, a selected pen shuttle, such as pen shuttle 74, is moved by rotation of actuator beam 13 in a downward direction until pen point 34 of pen 64 contacts the surface of media 80.

Thereafter, a selected recording pen such as pen 64 is lowered to its recording position and combinations of pen carriage motion in directions indicated by arrows 23 and 324 together with coordinated motions of media 80 in the directions indicated by arrow 85 result in recording a plurality of line markings 83 upon media 80.

Figure 2:
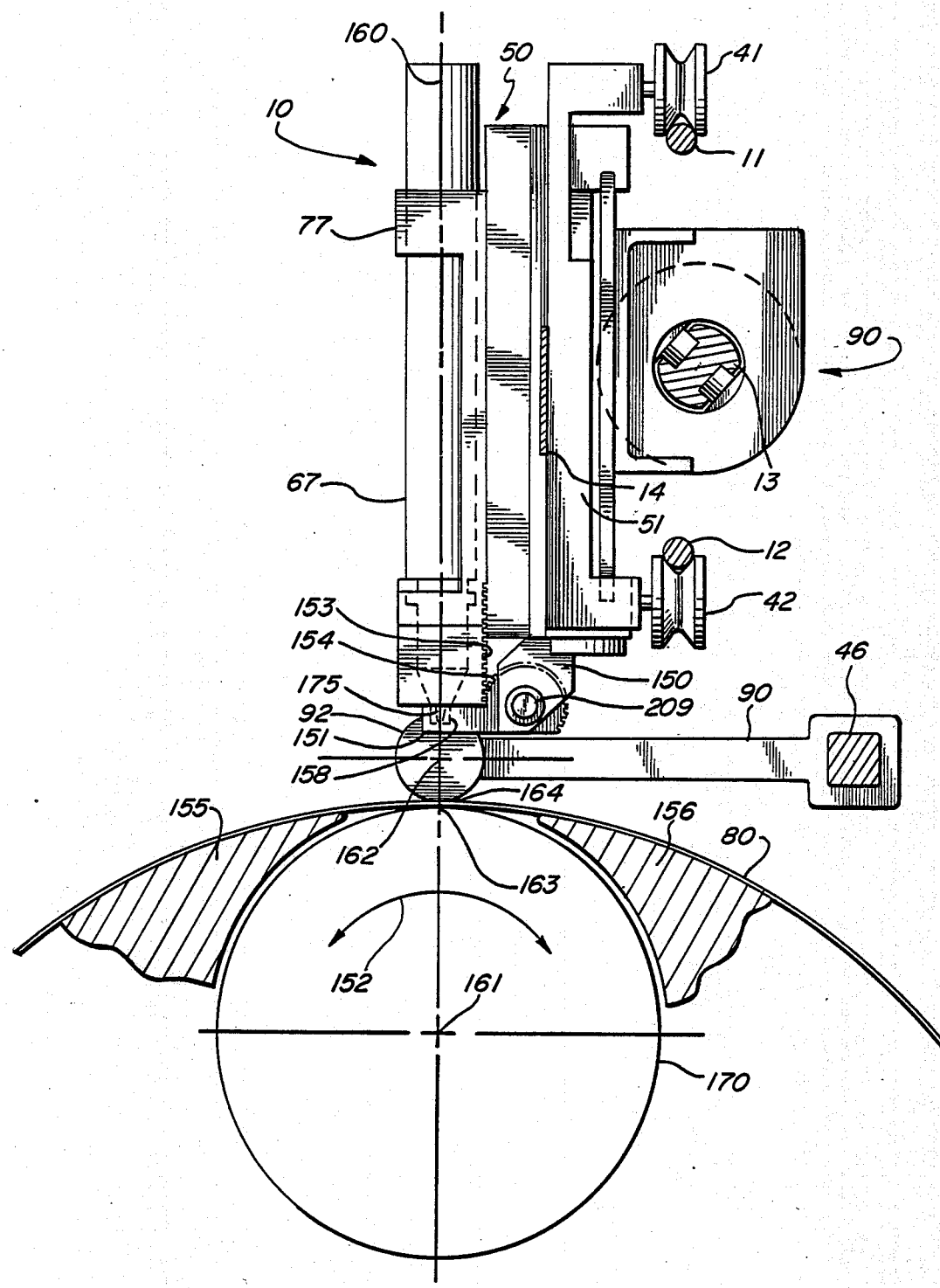
FIG. 2 is a partial section view of a direct writing over-the-drum graphic recorder constructed in accordance with the present invention taken along section lines 2—2 in FIG. 1.
Figure 3:
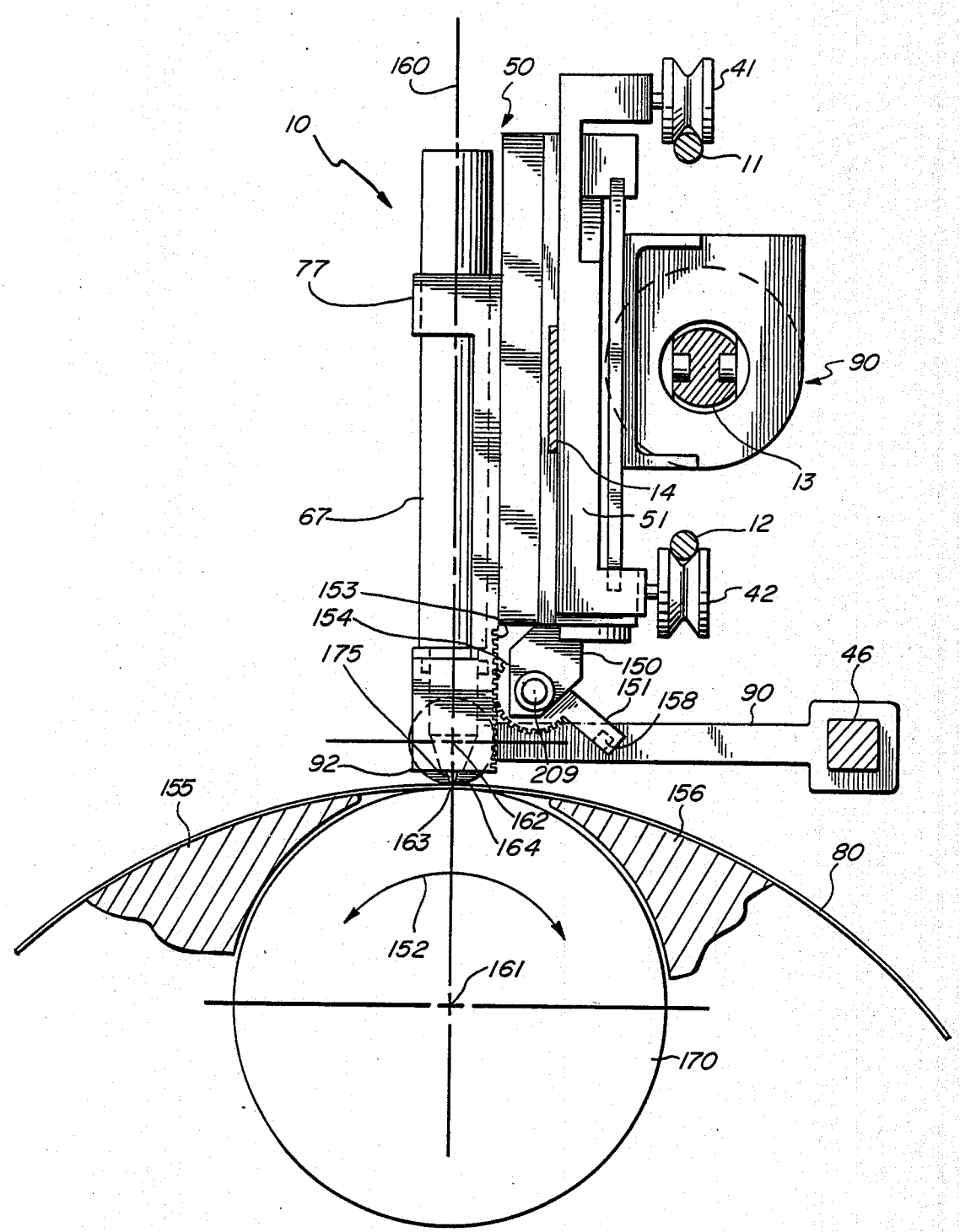
FIG. 3 is a partial section view of a direct writing overthe-drum graphic recorder constructed in accordance with the present invention taken along section lines 2—2 in FIG. 1 during recording.

While the pen selection process is set forth in greater detail in the above-referenced copending application for a Rotary Action Graphic Recording System, however, suffice it to state here that pen selection is performed by simply securing rotary drive 90 seen in FIG. (2) at a fixed position with respect to actuator beam 13 by counterclockwise rotation of actuator beam 13 to a predetermined position and moving carriage 10 until the appropriate pen is aligned with rotary drive 90. Rotation of actuator ream 13 causes rotary drive 90 to engage pen carriage 10 at the point corresponding to the selected pen shuttle causing rotary drive 90 to be carried by pen carriage 10. Once engaged, rotary drive 90 continues to be carried by pen carriage 10 and vertical pen motions in an out of engagement with the media necessary to undertake the above-described plotting operation simply require rotation of actuator beam 13 to raise and lower the engaged pen shuttle and thereby the operative pen. FIGS. 2 and 3 set forth partially sectioned views of pen carriage 10 and rotary drive 90 and depict the raised and recording positions respectively of rotary drive 90. FIG. 2 sets forth the recorder rest position in which a selected pen has been engaged but is not moved downwardly into the recording position while FIG. 3 sets forth the recorder with the selected pen in the recording position.

FIG. 2 sets forth a partially sectioned view of the present invention graphic recorder taken along section lines 2—2 in FIG. 1 in the nonrecording position. Pen shuttle guide 50 supports a plurality of pen shuttles 70 through 77 (better seen in FIG. 1) including pen shuttle 77. As mentioned above, pen shuttle 77 is slideably moveable within pen shuttle guide 70 between raised and lowered positions. A wheel support 51 is secured to pen shuttle guide 50 and supports a pair of grooved wheels 41 and 42. As is better seen in FIG. 1, pen carriage 10 further includes an identical wheel support 52 secured to the opposite end of pen shuttle guide 50 supporting a pair of grooved wheels 40 and 43 (the latter not seen). Wheels 40 through 43 are receive upon and engaged with a pair of parallel spaced tracks 11 and 12. A flange 150 extends downwardly from pen shuttle guide 50 and supports a pen cap 151 which is pivotally secured to flange 150 by a pin 209. Pen cap 151 further defines a circular gear segment 154. Pen shuttle 77 supports a recording pen 67 such that a pen tip 175 of pen 67 extends from the lower portion of pen shuttle 77 and is received within recess 155 of pen cap 151.

An elongated arm 90 is secured to a transversely supported beam 46 at one end and supports a roller 92 at the other end. In accordance with the above-described construction, roller 92 is freely rotatable upon arm 90. A media roller 81 having a generally cylindrical construction is supported by means not shown beneath pen carriage 10. A pair of media supports 155 and 158 are positioned on either side of media roller 81. A recording media 80 extends over media supports 155 and 158 and to either side thereof and rests upon media roller 81. In accordance with the invention, media roller 81 defines a gripping surface 170 which, in its preferred form, comprises a grit wheel surface suitably configured to firmly engage the undersurface of media 80. Accordingly, media 80 is received upon surface 170 of media roller 81 at a contact point 163. With temperature reference to FIG. 1, it should be understood that contact point 163, due to the cylindrical construction of media roller 81 and the generally planar structure of media 80, actually defines a contact line extending the length of media 80. In the position shown, arm 90 is rotated by operation of beam 46 in the manner described above to cause roller 92 to be forced against the upper surface of media 80 resulting in a captivating pressure upon media 80 between roller 92 and media roller 81. Due to the cylindrical construction of roller 92 and the generally planar construction of media 80, roller 92 contacts media 80 at a contact point 64. In addition, media roller 81 defines a center 161 while roller 92 defines a center 162. Pen 67 defines a major axis 160 which, in its preferred form, is vertically aligned as shown in FIG. 2.

In accordance with an important aspect of the present invention, media roller 81 and roller 92 are positioned with respect to pen carriage 10 such that centers 161 and 162 of rollers 81 and 92 are aligned with major axis 160 of pen 67. This in turn causes contact points 163 and 164 of media 80 with rollers 81 and 92 respectively to also be in vertical alignment with pen axis 160. As a result, media 80 is firmly secured to media roller 81 along recording line 97 (seen in FIG. 1) which is also aligned with vertical axis 160 of pen 67. Because pens 60 through 66 are supported in a linear array upon pen carriage 10 and because tracks 11 and 12 are parallel to recording line 97, the remaining pens within pen carriage 10 are vertically aligned with respect to media roller 80 in the same manner as shown for pen 67.

A rotary drive assembly 90, the structure and operation of which is set forth in greater detail in the above-referenced copending application for a Rotary Action Graphic Recording System, is supported upon pen shuttle guide 50. Rotary drive 90 is coupled to beam 13 and is operative to engage a selected one of pens 60 through 67 and translate a rotational movement of beam 13 to a downward movement of a selected pen shuttle.

FIG. 3 sets forth the partially sectioned view of the present invention graphic recorder shown in FIG. 2 in which pen 67 has been lowered to its recording position. Accordingly, the rotation of beam 13 and the coupling of rotary drive 90 to pen shuttle 77 by means set forth in detail in the above-referenced copending application for a Rotary Action Graphic Recording System causes pen shuttle 77 and thereby pen 67 to be move downwardly with respect to pen shuttle guide 50 until pen tip 175 is brought into contact with the upper surface of media 80. It should be noted that the coupling of gear 154 of pen cap 151 and gear 153 of pen shuttle 77 cooperate to pivot pen cap 151 about pin 209 to the open position shown in FIG. 3 in which pen shuttle 77 is moved downwardly passed pen cap 151 exposing pen tip 175 to contact with media 80. In accordance with an important aspect of the present invention, the above-described alignment of pen axis 160 and rollers 81 and 92 cause pen tip 175 to contact media 80 along recording line 97 which coincides with contact point 163. As a result, the recording pressure exerted downwardly upon pen 67 and imparted to pen tip 175 against media 80 is supported along recording line 97 by media roller 81. In accordance with an important aspect of the present invention, the positioning of pen tip 175 with respect to media roller 81 in the manner shown causes the recording pressure of pen 67 to be directly exerted against surface 170 of roller 81 which aids the gripping action of surface 170 against media 80. In addition, the direct alignment set forth above precludes any possibility of media buckling as media roller 81 is rotated in the directions indicated by arrow 152 to produce back and forth motions of media 80. Media supports 1555 and 158 cooperate to support the portions of media 80 adjacent to recording line 97.

As a result, the recording operation may be carried forward at greater speeds of media movement because the above-described problems of media buckling and movement in the prior art offset system are not encountered. In addition, because media roller 81 firmly supports media 80 beneath the line of pen contact, greater recording pressures may be used without fear of damage or distortion of media 80.

What has been shown is an improved graphic recording system in which the media drive system facilitates the rapid media movement during recording and permits recording directly against the media roller.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A graphic recorder for recording upon a flexible recording media defining edge portions comprising:
   a moveable pen carriage having one or more recording pens each having a recording tip supported thereon arranged in a linear array parallel to said carriage path in which said recording pens each define a major axis through said recording tip which are vertically aligned and each of said recording pens are moved along their vertically aligned major axes to and from their recording positions:
   carriage drive means for moving said pen carriage along a pen carriage path;
   a media drum, said media drum for supporting said flexible media during recording, defining a generally cylindrical media surface textured to grip said media and a major axis, supported such that said major axis is parallel to said pen carriage path;
   media drive means, coupled to said media drum, for causing rotation of said media drum about said major axis;
   pen means for moving a selected recording pen into a recording position which said recording tip of said selected recording pen contacts said media and presses said media against said media surface of said media drum, the locus of points recordable by said selected recording pen in the absence of media drum rotation defines a recording line extending across said media drum; and
   a pair of rollers positioned in a spaced apart relationship overlying and contacting the portions of the flexible media and cooperating to captivate a portion of the flexible media against said media surface such that said flexible media contacts said media surface of said media drum along said recording line, said recording line and said major axis of said media drum being parallel and coplanar and said vertically aligned major axes of said recording pens being perpendicular to and coplanar with said recording line and said major axis of said media drum.

2. A graphic recorder as set forth in claim 1 wherein said pair of rollers contact said flexible media on said recording line.

* * * * *